United States Patent [19]
Fukuhara et al.

[11] Patent Number: 5,271,650
[45] Date of Patent: Dec. 21, 1993

[54] VEHICLE BUMPER AND METHOD OF MAKING SAME

[75] Inventors: Naoshige Fukuhara, Okayama; Michitaka Ohta, Hiroshima; Norihisa Sasano, Hiroshima; Tomoyuki Koide, Hiroshima, all of Japan

[73] Assignees: Mazda Motor Corporation, Tokyo; Minoru Kasei Co., Ltd., Hyogo, both of Japan

[21] Appl. No.: 55,391

[22] Filed: May 3, 1993

Related U.S. Application Data

[63] Continuation of Ser. No. 769,353, Sep. 27, 1991, abandoned.

[30] Foreign Application Priority Data

Sep. 29, 1990 [JP] Japan ................................ 2-262232
May 28, 1991 [JP] Japan ................................ 3-124043

[51] Int. Cl.$^5$ .............................................. B60R 19/24
[52] U.S. Cl. .................................... 293/120; 293/155
[58] Field of Search .............................. 293/120–122, 293/154, 155

[56] References Cited

U.S. PATENT DOCUMENTS

| 1,580,203 | 4/1926 | Jasheway et al. | 293/122 X |
| 2,829,915 | 4/1958 | Claveau | 293/120 X |
| 4,072,334 | 2/1978 | Seegmiller et al. | 293/122 |
| 4,320,913 | 3/1982 | Kuroda | 293/122 X |
| 4,533,166 | 8/1985 | Stokes | 293/120 |
| 4,586,738 | 5/1986 | Butler et al. | 293/122 X |
| 4,715,630 | 12/1987 | Manning | 293/122 X |
| 4,951,986 | 8/1990 | Hanafusa et al. | 293/122 X |
| 5,123,688 | 6/1992 | Takado et al. | 293/120 |

FOREIGN PATENT DOCUMENTS

| 2258987 | 9/1978 | France | 293/120 |
| 58-194941 | 12/1983 | Japan . | |
| 62-78543 | 5/1987 | Japan . | |
| 2154953 | 9/1985 | United Kingdom | 293/122 |

Primary Examiner—Dennis H. Pedder
Attorney, Agent, or Firm—Keck, Mahin & Cate

[57] ABSTRACT

A blow formed, one-piece, hollow bumper includes a bumper body member, and a reinforcing frame member for connection with the vehicle frame. The frame member projects into the hollow inside of the body member from the backside of the body member. The frame member is formed in one piece with the body member attached to a vehicle frame attachment portion of the body member. In one embodiment, the frame member is closed off with a metallic plate member so as to form a box cross section. A method of making the bumper is also disclosed and includes the steps of setting the frame member in a mold and blow forming a bumper member integral with the frame.

5 Claims, 7 Drawing Sheets

VEHICLE BUMPER AND METHOD OF MAKING SAME

This is a continuation of application Ser. No. 07/769,353, filed Sep. 27, 1991, abandoned.

BACKGROUND OF THE INVENTION

1. Field of the Invention

The present invention relates to a vehicle bumper and a method of making the same. The invention particularly relates to a one-piece, blow-formed, hollow bumper having an integral reinforcement frame and a method of making the same.

2. Description of the Prior Art

Until recently bumpers employed in vehicles such as automobiles and the like have been metallic. However, in recent years, mainly bumpers made from resin composite materials have been employed to meet weight reduction demands. In oder to impart sufficient rigidity, many composite resin bumpers are reinforced with metallic reinforcements. An example of a bumper in which sheet metal reinforcements are formed integrally into the rear of a main bumper body made of hollow composite resin material is disclosed in Japanese Utility Model Unexamined Publication No. 58-194941. In the described example, the reinforcements are closely matched and extend across substantially the entire width of the rear of the main body of the bumper. The reinforcements have pins on their upper and lower parts which project in the forward direction and are integrated into the main body of the bumper by insertion. As a result, when the long reinforcements are integrated into the main bumper body, a problem arises in that because of the difference in thermal expansion coefficients, peeling off and play between the frame and the bumper occurs.

This type of problem is solved, for example, by providing the possibility of relative movement in a separately formed composite resin main bumper body connected to the metal plate reinforcements by means of a nuts and bolts, as is described in Japanese Utility Model Unexamined Publication No. 62-78543.

In order to sufficiently protect the vehicle and the passengers, the bumper must have sufficient initial rigidity and load tolerance. After all, in a crash exceeding a given limit, in order for the seat belt and/or air bag, which protects the passenger, to function well, there are great demands on the bumper to keenly tolerate high loads without crushing. Also, it is desirable that the bumper body itself has sufficient load tolerance to crushing in order to protect the vehicle body from damage.

In order to obtain sufficient initial rigidity, it is necessary for the bumper to be strengthened by being formed integrally with reinforcements, for example, by being formed in one piece by means of blow forming. However, as stated above, if peeling and/or play between the frame and the bumper occurs, not only does the initial rigidity decrease, but so does the load tolerance. In addition, if, as in the prior art, a hollow bumper body is integrated with metallic plate reinforcements in its rear surface, because the reinforcements are fixed to the vehicle body by means of so-called stays, a design problem results because the total length of the vehicle is increased. One the other hand, if, as subsequent artisans have done, relative movement of the reinforcements is provided in the main body of the bumper, it is difficult to obtain sufficient initial rigidity. If the bumper has a large camber, the decrease in initial rigidity is particularly severe, because the stretching deformation of the bumper in the left and right directions is large during impact.

SUMMARY OF THE INVENTION

It is, therefore, an object of the present invention to solve the problems with the state of the art technology. More specifically, to provide a vehicle bumper with increased initial rigidity and load tolerance to crushing during impact, and to provide a method of making the same.

In accordance with the above objects, the present invention provides a blow formed, one-piece, hollow bumper. In one embodiment of the present invention, the bumper comprises a bumper body member, and a reinforcing frame member for connection with the vehicle frame. The frame member projects into the hollow inside of the body member from the backside of the body member, and the frame member is formed in one piece with the body member.

In another embodiment of the present invention, the frame member is closed off with a metallic plate member so as to form a box cross section.

The present invention also provides a method of manufacturing a vehicle bumper having a front side facing away from the vehicle and a backside facing toward the vehicle. The method has the steps of setting a reinforcing frame member in a mold 1, and blow forming a hollow-centered, one-piece bumper body in the mold. The frame member is thus made integral with the bumper member and projects into the hollow center of the bumper member from the backside of the bumper.

Further objects, features and advantages of the present invention will become apparent from the Detailed Description of the Preferred Embodiments which follows when considered together with the drawings.

DETAILED DESCRIPTION OF THE PREFERRED EMBODIMENTS

Figure 1:
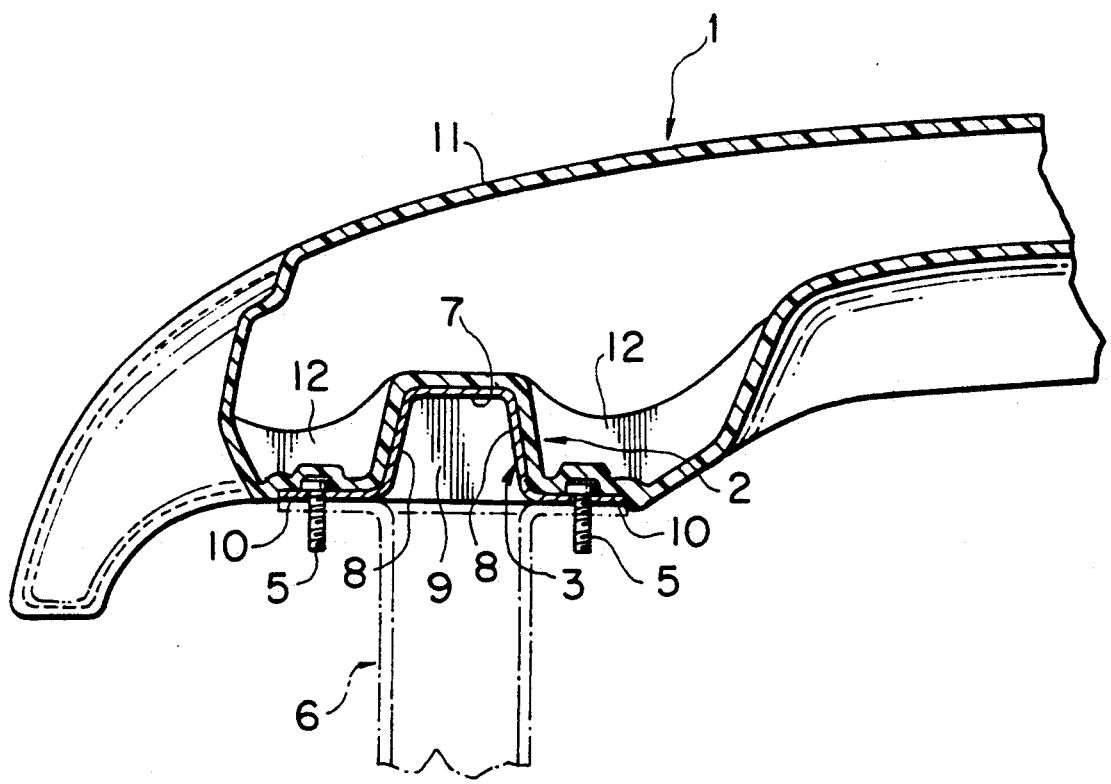
FIG. 1 is a partial cross sectional view of the essential portion of the bumper according to one embodiment of the invention.
Figure 2:
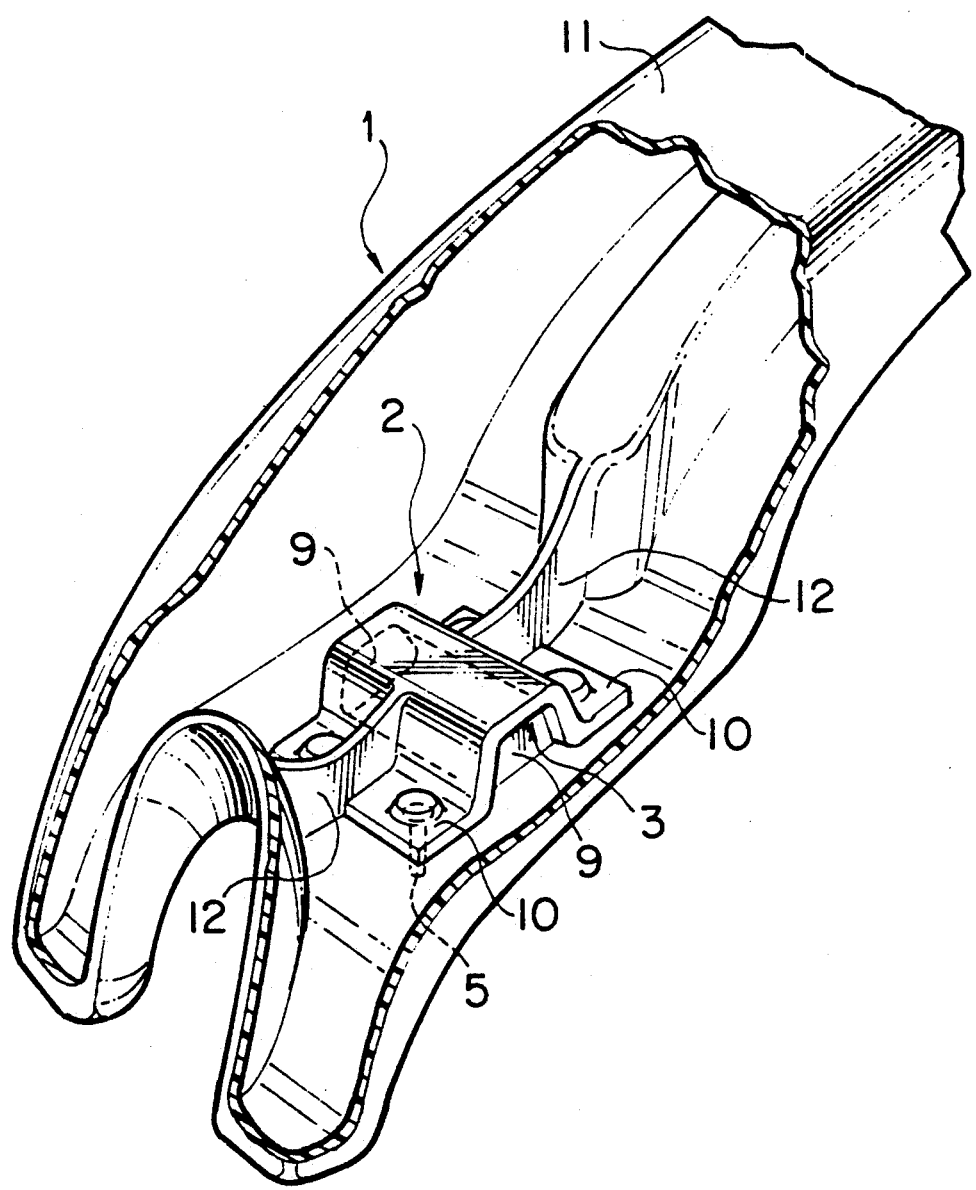
FIG. 2 is a partial cut-away, perspective view of the embodiment of FIG. 1.
Figure 3:
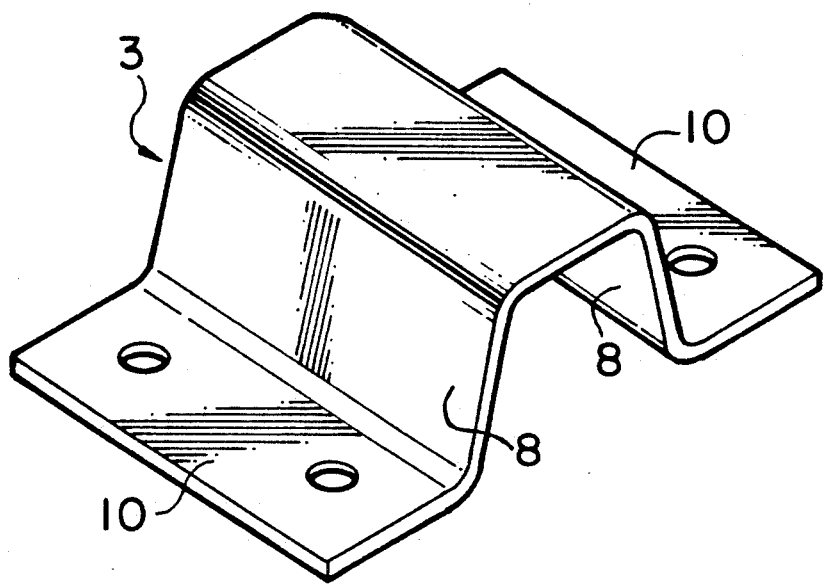
FIG. 3 is a perspective view of the reinforcement frame of the embodiment of FIG. 1.

The vehicle bumper 1 of the present invention, as shown in FIG. 1 and as summarized above, is formed in one piece with reinforcement frame 3 and has demonstrated high initial rigidity upon impact. As a consequence of the reinforcement frame 3 being formed integrally with and fixed to the resin composite material, the frame 3 itself has higher rigidity and stably increases the rigidity of bumper 1. By means of the vehicle bumper and frame being integrated and fixed by being stuck together by blow forming, even if there is deformation upon impact, gaps between therein do not arise. As a consequence of mutual reinforcement, the reinforcement frame 3 does not deform easily, so that a stable and high rigidity can be obtained.

The reinforcement frame 3 partially projects forward at the portion 2 of the bumper 1 which attaches to the vehicle frame. As a consequence, separations or play caused by differences in heat expansion coefficients in the vehicle do not occur.

In addition, when the reinforcement frame 3 is closed by plate member 14 on the side where it joins the vehicle frame (see FIG. 5) and box cross section 15 is formed, because the rigidity of reinforcement frame 3 is increased and collapsing deformation made more difficult, the initial rigidity and load tolerance upon impact is further increased.

The above-described bumper can be easily formed in one piece by means of blow forming.

One can actually measure the improvement of the initial rigidity and the load tolerance, where, as in the bumper of the present invention, a hollow bumper body member is blow-formed to be integrally attached to a reinforcement frame which projects into the hollow bumper body from the back.

The rigidity of the reinforcement frame increases, and as a consequence the initial rigidity and load tolerance crushing of the bumper also improve when the portion of the reinforcement frame on the side attached to the vehicle frame is closed off by a plate member to form a box cross section reinforcement frame. This latter bumper construction is also easily formed in one piece by blow forming.

Reference will now be made to the drawings in which like parts have like reference numerals.

The first embodiment of the present invention will be discussed with reference to FIGS. 1-4. As is shown in FIG. 1, hollow bumper member 1 stretches in the direction of the width of the vehicle. A vehicle frame attachment portion 2 is formed on the inside on both sides of bumper member 1 (only the left side is shown in the figure). A connecting bolt 5 is directly attached to the vehicle frame attachment portion 2. By means of connecting bolt 5, the bumper member 1 is fixed to the front end of each of the vehicle frames 6 positioned toward the front and back of the vehicle (not shown).

A sheet metal reinforcement frame 3 having a hat-shaped cross section is fixed integrally with and projects into the inside of the frame attachment portion 2, thus forming a reinforced structure strengthening the bumper member 1. In other words, the outer surface of the reinforcement frame 3 is covered with the resin composite material of the main bumper body 11. The front surface 7 of the frame 3 is facing and spaced from the front inner surface of bumper 11. At both sides 8, the approximately horizontal ribs 12 are formed in one piece with the bumper body 11 and approximately at right angles to the sides 8 in order to support both sides of the reinforcement frame 3. Two side walls 9 (see FIG. 2) are formed in the frame 3 to offset the ribs 12 slightly left and right of the side of the frame 3.

By means of this kind of construction, the vehicle frame attachment portion 2 of the bumper 1 is integrally given high rigidity. The rigidity of the reinforcement frame 3 which is formed on the inside of portion 2 is also improved. Also, the reinforcement frame 3 allows the bumper 1 to resist deformations not only with respect to loads from the front but also with respect to loads at oblique angles.

Because the bolt 5, which serves to attach the bumper 1 to the vehicle frame 6, is already inserted into the flange portion 10 (see FIG. 2) of the reinforcement frame 3 when it is integrated into the bumper body 11, the rigidity of the attachment to the vehicle frame is increased.

Figure 4:
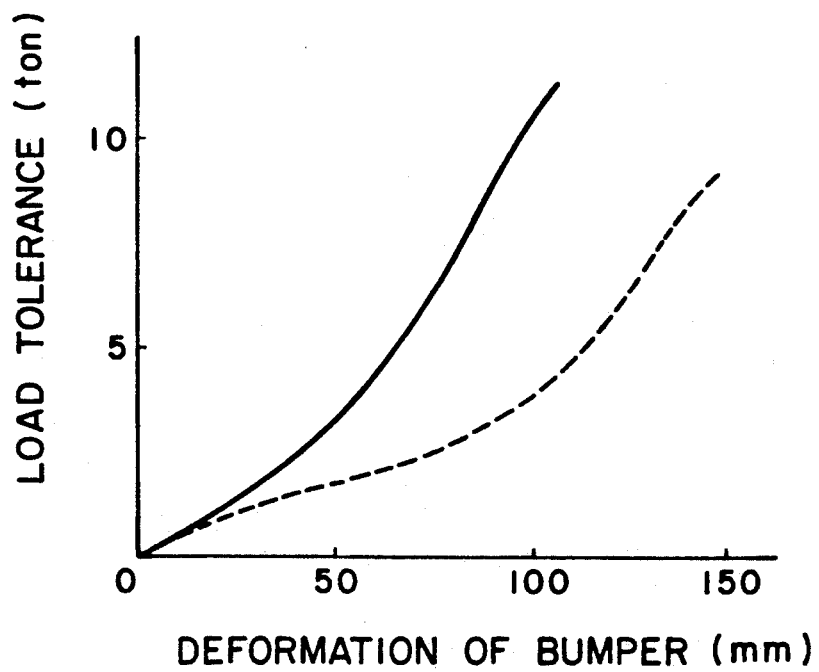
FIG. 4 is a graph showing the load tolerance properties of the bumper of the present invention.

As indicated by the solid line in FIG. 4, in the one-piece, hollow bumper 1 of the present invention, the rise in load tolerance to crushing forces with respect to deformation of bumper during impact is great. Therefore, initial rigidity is remarkably increased. On the other hand, when a saparately formed reinforcement frame and bumper body are connected by means of a nut and bolt connection as in the prior art, during impact, the clearance between the vehicle frame and the bumper is great. There is also clearance between the reinforcement frame and the bumper body. Therefore, as is indicated by the broken line in FIG. 4, in the prior art, the rise in the load tolerance is late. Because the supporting rigidity of the reinforcement frame itself is not sufficient, and because deformation is easy, buckling occurs easily and it is hard to obtain stable load tolerance.

In other words, as is stated above, in the first embodiment of the present invention, the structure of the reinforcement frame 3 itself is difficult to collapse. Because the frame 3 is integrated into the bumper body 11, the load tolerance is stably increased. As a consequence, if the camber is made large in the first embodiment of the bumper 1 according to the invention, lateral stretching deformation is small. Even if a load acting from the oblique direction is applied, buckling collapse is prevented and stable load tolerance is demonstrated, because the frame 3 is not deformed laterally.

In the above manner, because the initial rigidity of the bumper is increased in the first embodiment of the present invention, when the impact exceeds a given limit, the seat belt and or airbag can be operated with excellent timing and the safety of the passenger is increased. As a consequence of the stable increase in the load tolerance to crushing during impact, damage to the vehicle can also be greatly reduced.

The bumper 1 can be easily formed by blow forming composite resin into a cavity which already contains the reinforcement frame 3 and attachment bolt 5 set into it. During forming, the reinforcement frame 3 is formed together with the head of the bolt 5 and the two are attached integrally to the bumper body 11. The reinforcement frame 3 is not long and is formed in one piece with the vehicle frame attachment portion 2 on each side of the bumper body 11. Problems due to gaps, etc., caused by differences in the heat expansion coefficients between the bumper body 11 and the frame 3 thus do not arise.

The second embodiment of the present invention will next be described referring to FIG. 5. In the second embodiment of the present invention, the vehicle frame attachment side 4 of the reinforcement frame 3 is closed off by a plate member 14 which is fixed to both flange portions 10. In the vertical direction, the reinforcement frame 3 thus has a box cross section 15. In this way, rigidity of the vehicle frame attachment portion 2 of the bumper 1 is increased still more, and because the attachment rigidity of the attachment portion 2 is increased with respect to the vehicle frame 6 and the flange portions 10 of the reinforcement frame 3 are stabilized, crushing of the reinforcement frame 3 is made still more difficult. In addition, the load tolerance to crushing increases with respect to loads from the front. It is preferable that plate member 14 be spot welded at 16, 16 to both flanges 10 before forming.

Figure 6:
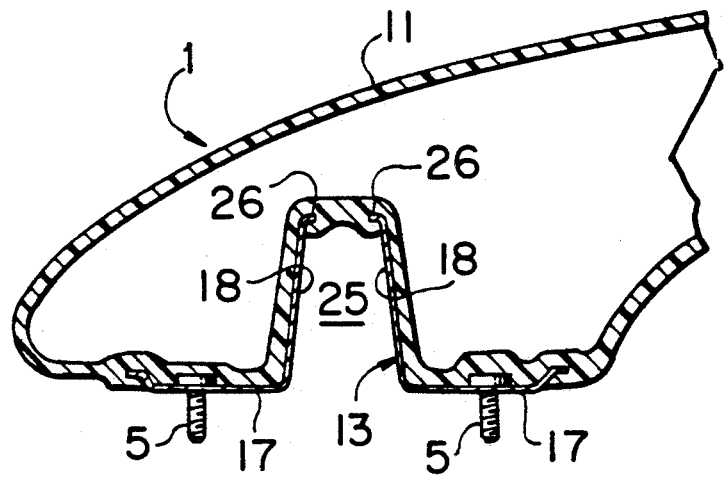
FIG. 6 is a partial cross sectional view of the essential portion of a third embodiment of the present invention.

The third embodiment of the present invention will be explained with reference to FIGS. 6 and 7. In the third embodiment, the reinforcement frame 13 is spot-welded together at 21, 22 on overlapping tabs portions 23, 24 which are bent inward from the two side parts 18. The side parts 18 are themselves bent upwards from the flange portions 17. Reinforcement frame 13 has a box cross section 25, as seen in the plane normal to the plane of FIG. 6, formed by the upper overlapping tab portion 23, the lower overlapping tab portion 24 and the two side portions 18. The front portion of the reinforcement frame 13 has two flange-shaped, opposing, spaced-apart side edge portions 26 which are bent inward from the two side portions 18. The composite resin of the bumper body 11 bridges the space between and integrates the two side edge portions 26. The two side portions 18, including the two overlapping tab portions 23, 24, and the outer surface of the two flange portions 17 are integrated into the bumper body 11. In this third embodiment, because a box cross section 25 is formed in the front and back direction as viewed in FIG. 7, the frame 13 is made more difficult to collapse.

Figure 8:
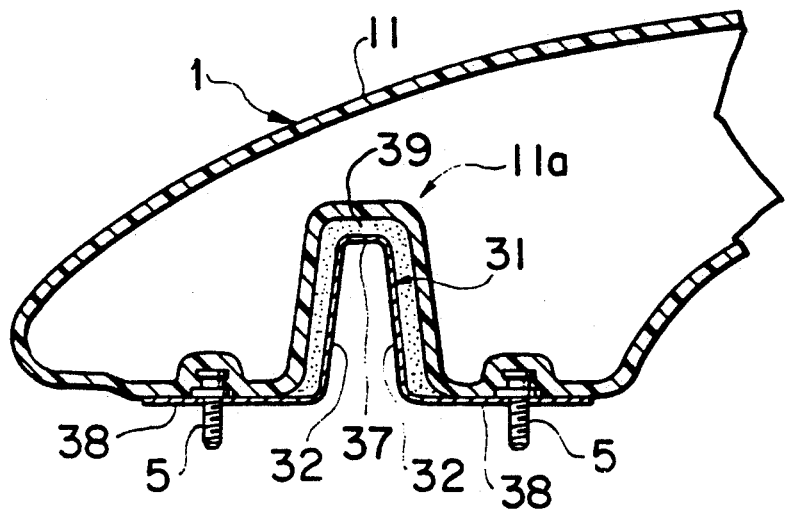
FIG. 8 is a partial cross sectional view of the essential portion of a fourth embodiment of the bumper of present invention.

The fourth embodiment of the present invention will be explained with reference to FIGS. 8 and 9. In the fourth embodiment, frame 31 has an approximately hat-shaped cross section, and is formed into a box-like shape with two side portions 32, upper and lower overlapping tab portions 35, 36 which are bent inward from the side portions 32 and spot welded together at 33 and 34 as in the third embodiment, and front surface portion 37.

Because the frame 31 in itself has greater rigidity, only flange portions 38 are integrated into the bumper body 11, the box like part is surrounded with foam material 39 the outer surface of which is covered and integrated with the composite resin material of the bumper body 11. This whole construction with the frame forms forwardly-projecting portion 11a. By means of the cushioning ability of the forwardly-projecting portion 11a, the bumper can moderately absorb shock, and above a certain degree of shock, the bumper functions as the previous embodiments by maintaining good initial rigidity.

Figure 10:
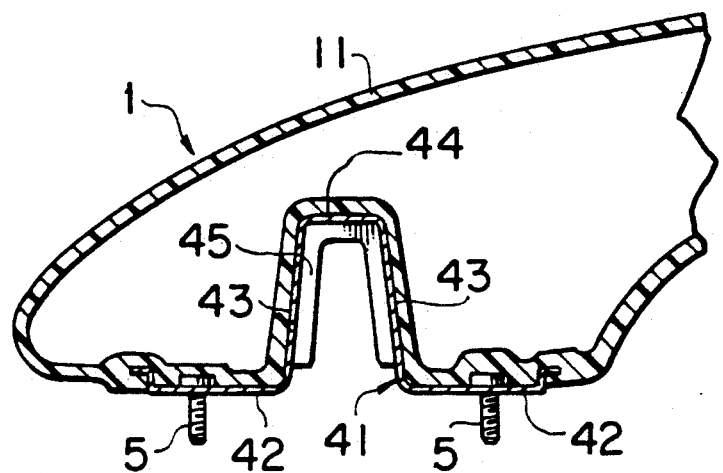
FIG. 10 is a partial cross section of the essential portion of a fifth embodiment of the bumper according to the present invention.

The fifth embodiment of the present invention will be explained with reference to FIGS. 10 and 11. In the fifth embodiment, the reinforcement frame 41 has a hat-shaped cross section and is constructed from flange portions 42, two side portions 43 bent up from the flange portions 42, a front surface 44, and reinforcement ribs 45 which are attached to and integral with the upper and lower edges of the front surface 44 and side portions 43. In ther construction according to the fifth embodiment, because of the attached ribs 45, the reinforcement frame 41 itself has greater rigidity and is more difficult to collapse.

The above bumper construction can be formed as stated above by blow forming with the reinforcement frame and the attached bolt set in the cavity of the mold.

Figure 5:
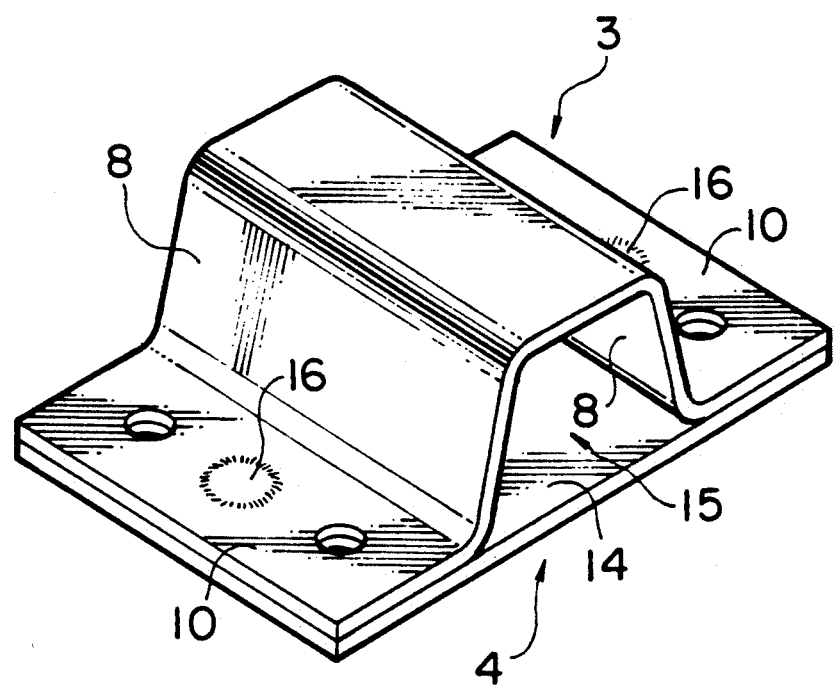
FIG. 5 is a perspective view of the reinforcement frame of a second embodiment of the present invention.
Figure 7:
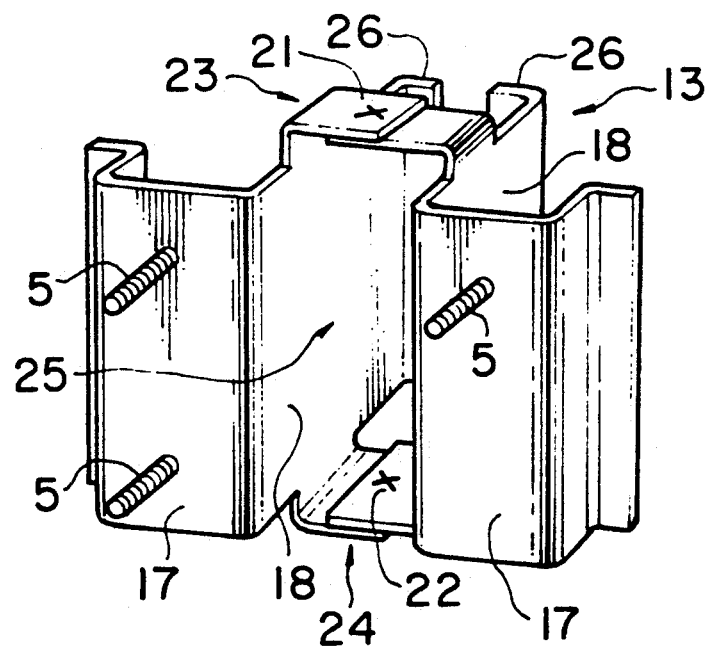
FIG. 7 is a perspective view of the reinforcement frame of the third embodiment of the present invention.
Figure 9:
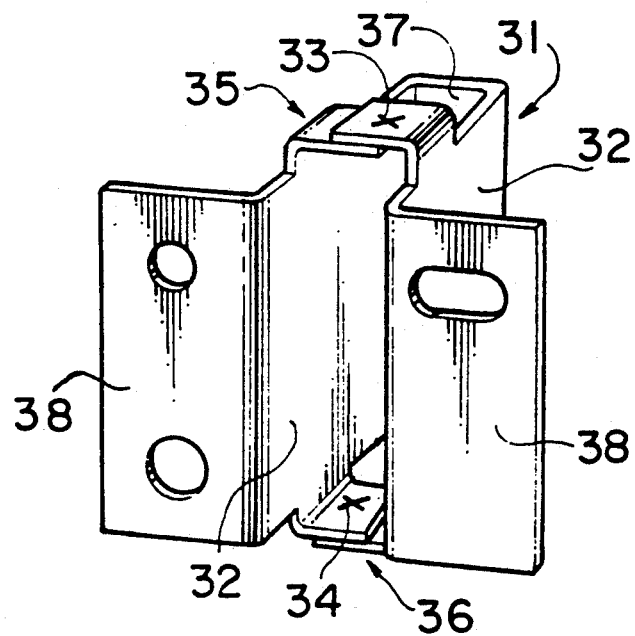
FIG. 9 is a perspective view of the reinforcement frame used in the fourth embodiment of the present invention.
Figure 11:
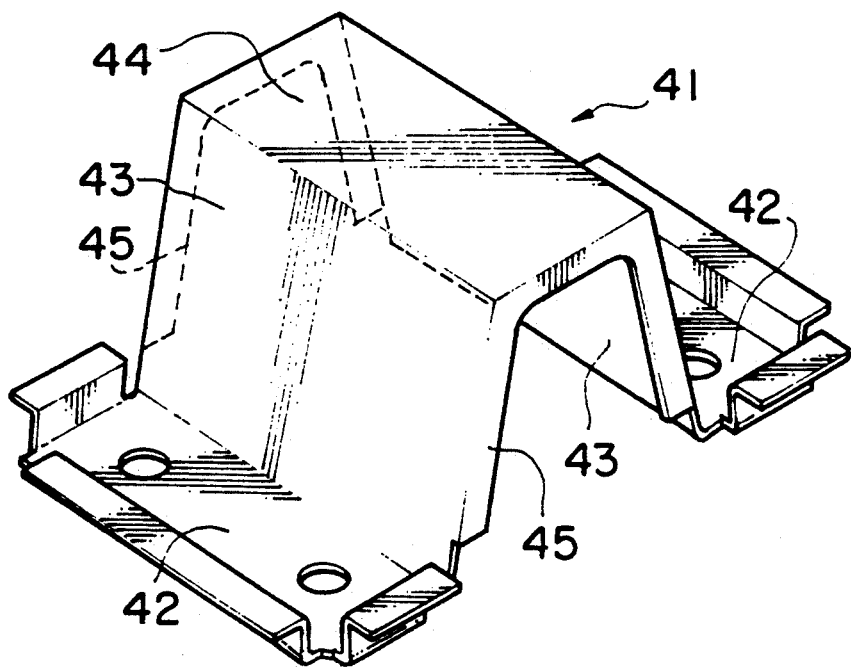
FIG. 11 is a perspective view of the reinforcement frame used in the fifth embodiment of the present invention.

One can suitably apply the plate member 14 shown in FIG. 5 to the reinforcement frames shown in FIGS. 7, 9, and 11.

While the present invention has been illustrated by means of several preferred embodiments, one of ordinary skill in the art will recognize that modifications and improvements can be made while remaining within the spirit and scope of the invention. The scope of the invention is determined soley by the appended claims.

What is claimed is:

1. A vehicle bumper having a front side facing away from the vehicle and a backside facing toward the vehicle, comprising:
    a blow-formed, one-piece bumper body defining a hollow center and including a vehicle frame attachment portion for connection to a frame of the vehicle;
    a reinforcing frame member integrally attached to the vehicle frame attachment portion of the bumper body, said vehicle frame attachment portion overlying said reinforcing frame member, said frame member projecting into the hollow center of the bumper body from the backside of the bumper; and
    reinforcement ribs for supporting said frame member, each of said reinforcement ribs being formed in one-piece with the bumper body and projecting substantially horizontally, and being attached to said vehicle frame attachment portion at a center portion of a vertical side surface of the frame member.

2. A bumper according to claim 1, wherein the frame member has a box cross section.

3. A bumper according to claim 1, further comprising a foam portion disposed between a front surface of the reinforcement frame member and the bumper body.

4. A bumper according to claim 1, wherein the frame member comprises a box cross section and an open front surface bridged by the bumper body.

5. A bumper according to claim 1, wherein the frame member comprises reinforcement ribs attached to upper and lower edges of a front surface and side portions of the frame member.

* * * * *